(12) United States Patent
Grandadam (10) Patent No.: US 10,865,949 B2
(45) Date of Patent: Dec. 15, 2020

(54) MULTI-PURPOSE FLASHLIGHT (71) Applicant: Promier Products, Inc., Peru, IL (US)

(72) Inventor: Cody Duane Grandadam, Peru, IL (US)

(73) Assignee: PROMIER PRODUCTS INC., Peru, IL (US)

( * ) Notice: Subject to any disclaimer, the term of this patent is extended or adjusted under 35 U.S.C. 154(b) by 0 days.

(21) Appl. No.: 16/596,559

(22) Filed: Oct. 8, 2019

(65) Prior Publication Data

US 2020/0116314 A1 Apr. 16, 2020

Related U.S. Application Data

(63) Continuation-in-part of application No. 29/665,848, filed on Oct. 8, 2018.

(60) Provisional application No. 62/742,692, filed on Oct. 8, 2018.

(51) Int. Cl.
| | |
|---|---|
| *F21L 4/00* | (2006.01) |
| *F21L 4/08* | (2006.01) |
| *F21L 4/02* | (2006.01) |
| *F21V 14/04* | (2006.01) |
| *F21V 21/084* | (2006.01) |
| *B67B 7/16* | (2006.01) |
| *F21Y 115/10* | (2016.01) |

(52) U.S. Cl.
CPC .............. *F21L 4/085* (2013.01); *F21L 4/027* (2013.01); *F21V 14/045* (2013.01); *F21V 21/084* (2013.01); *B67B 7/16* (2013.01); *F21Y 2115/10* (2016.08)

(58) Field of Classification Search
CPC ....... F21L 4/00; F21L 4/02; F21L 4/04; F21V 14/04; F21V 21/084; F21V 23/00; F21V 23/04; B67B 7/16; F21Y 115/10; A01K 85/16; A01K 97/00; F21S 4/28
USPC .......................................................... 362/208
See application file for complete search history.

(56) References Cited

U.S. PATENT DOCUMENTS

| | | | | |
|---|---|---|---|---|
| 6,027,224 | A * | 2/2000 | Schnell | B26B 11/00 |
| | | | | 362/119 |
| 6,684,557 | B1 * | 2/2004 | Yu | A01K 85/01 |
| | | | | 250/459.1 |
| 9,541,244 | B1 * | 1/2017 | Berezinski | F21L 4/085 |
| 9,958,150 | B1 * | 5/2018 | Tang | A62B 3/005 |
| 10,473,322 | B2 * | 11/2019 | Tang | B60R 22/32 |
| 2003/0221357 | A1 * | 12/2003 | Parsons | A01K 85/01 |
| | | | | 43/4.5 |

(Continued)

*Primary Examiner* — Ali Alavi
(74) *Attorney, Agent, or Firm* — Barnes & Thornburg LLP (57) ABSTRACT

A multi-purpose, hand-held flashlight has an elongated body with a front body portion having a bottle opener and a front engaging structure. The elongated body also includes a rear body portion with a rear engaging structure that is cooperatively dimensioned to interact with the front engaging structure to releasably couple the front body portion to the rear body portion. The rear body portion includes a second substantially cone shaped extent that includes a recessed cutting element. A lighting element assembly is disposed within the elongated body and includes a lighting element printed circuit board coupled to an emitter assembly, a power source, and a switch. The switch is configured to change the operational mode of the emitter assembly. An attachment mechanism is coupled to the second extent of the rear body portion.

19 Claims, 10 Drawing Sheets

(56) References Cited

U.S. PATENT DOCUMENTS

2019/0224861 A1\* 7/2019 Bloch .................... B26B 5/001

\* cited by examiner

MULTI-PURPOSE FLASHLIGHT

CROSS-REFERENCE TO RELATED APPLICATIONS

This application claims the benefit of U.S. Provisional Application No. 62/742,692, filed on Oct. 8, 2018 and U.S. Design Application No. 29/665,848 filed on Oct. 8, 2018, both of which are incorporated in their entirety herein by reference and made a part hereof.

TECHNICAL FIELD

This disclosure relates to a flashlight and, more particularly, to a multi-purpose, fishing lure shaped, portable flashlight adapted for a variety of activities, including fishing.

BACKGROUND

Portable light products are critical for outdoor, low-light (e.g. pre-dawn or dusk) and/or nighttime activities. Portable light products such as flashlights typically do not include accessories that are useful during outdoor activities, such as fishing. When people are using conventional light products, e.g., a flashlight, while fishing they must carry separate tools that are costly, require additional storage space and may get lost. For example, while fishing, a person may need a line cutter or a bottle opener in addition to the flashlight. Accordingly, there is an unmet need for a portable flashlight that includes various accessories, such as a line cutter and a bottle opener, while having a form factor that is easy to carry and store without taking up excess space while participating in a variety of activities, including fishing.

SUMMARY

A portable flashlight light is disclosed herein that is configured to be mounted in multiple configurations (e.g., hanging via an attachment mechanism, hand-held, or temporarily resting on or against a support surface), has multiple illumination states (e.g., "On", "Off", "high brightness", "low brightness: or "Flashing"), and allows a user to control illumination of the light using multiple different methods (e.g., manual, remote, or in response to a sensor).

The flashlight light also contains a bottle opener, a line cutter, or other accessories that may be utilized while participating in an outdoor activity, such as fishing. The flashlight may contain an internal power source that is configured to supply electrical current to the lighting element. A switch may be disposed on the body of the flashlight and configured to change the operational mode of the lighting element. The body of the flashlight may be configured with an elongated main body, which is in the shape of a fish or a lure.

Other features and advantages of the disclosure will be apparent from the following specification taken in conjunction with the following drawings.

BRIEF DESCRIPTION OF THE DRAWINGS

The drawing figures depict one or more implementations in accord with the present teachings, by way of example only, not by way of limitation. In the figures, like reference numerals refer to the same or similar elements.

DETAILED DESCRIPTION

While this disclosure includes a number of details and embodiments in many different forms, there is shown in the drawings and will herein be described in detail particular embodiments with the understanding that the present disclosure is to be considered as an exemplification of the principles of the disclosed methods and systems, and is not intended to limit the broad aspects of the disclosed concepts to the embodiments illustrated.

FIGS. 1-13 show a flashlight 10, which has a multi-purpose fishing lure-shaped configuration and is designed to provide flexible illumination solutions in both stationary and portable situations. In particular, a user can releasably secure the flashlight 10 to a line or hook using the attachment mechanism 12 of the flashlight 10. The user can subsequently detach the flashlight 10 from the line or hook and bring the flashlight 10, while illuminated or off, to another or second location that is distant from the first location to allow for portable illumination at that second location. The flashlight 10 can be placed or supported in various arrangements, which will be described in further detail below. The flashlight 10 also includes accessories (e.g., bottle opener structure 14 and line cutter 16) that are included within the flashlight 10, which may be useful while participating in an outdoor activity (e.g., fishing). Accordingly, the flashlight 10 provides the user with multiple mounting configurations (e.g., hanging via the attachment mechanism 12, hand-held, or temporarily resting on or against a support surface), multiple illumination states (e.g., "On", "Off", or "Flashing"), and multiple methods for controlling the illumination state (e.g., manual, remote, or in response to a sensor).

FIGS. 1-13 show a flashlight 10 that has an elongated body 20, which is configured in the shape of a fishing lure, and an attachment mechanism 12. The body 20 is comprised of a front body portion 22 and a rear body portion 26 that are releasably coupled to one another. In particular, the front body portion 22 includes a front engaging structure 27 (e.g., threads) and the rear body portion 26 includes a rear engaging structure 29 (e.g., threads). The threads of the front engaging structure are cooperatively dimensioned with the threads of the rear engaging structure. Thus, a user can disconnect the front body 22 from the rear body 26 by rotating or unscrewing them from one another. It should be understood that other ways of releasably attaching the front body 22 to the rear body 26 are contemplated by this disclosure, such as a bayonet style connector, a pin and socket, a quarter-turn connector and other similar types of connectors.

Figure 1:
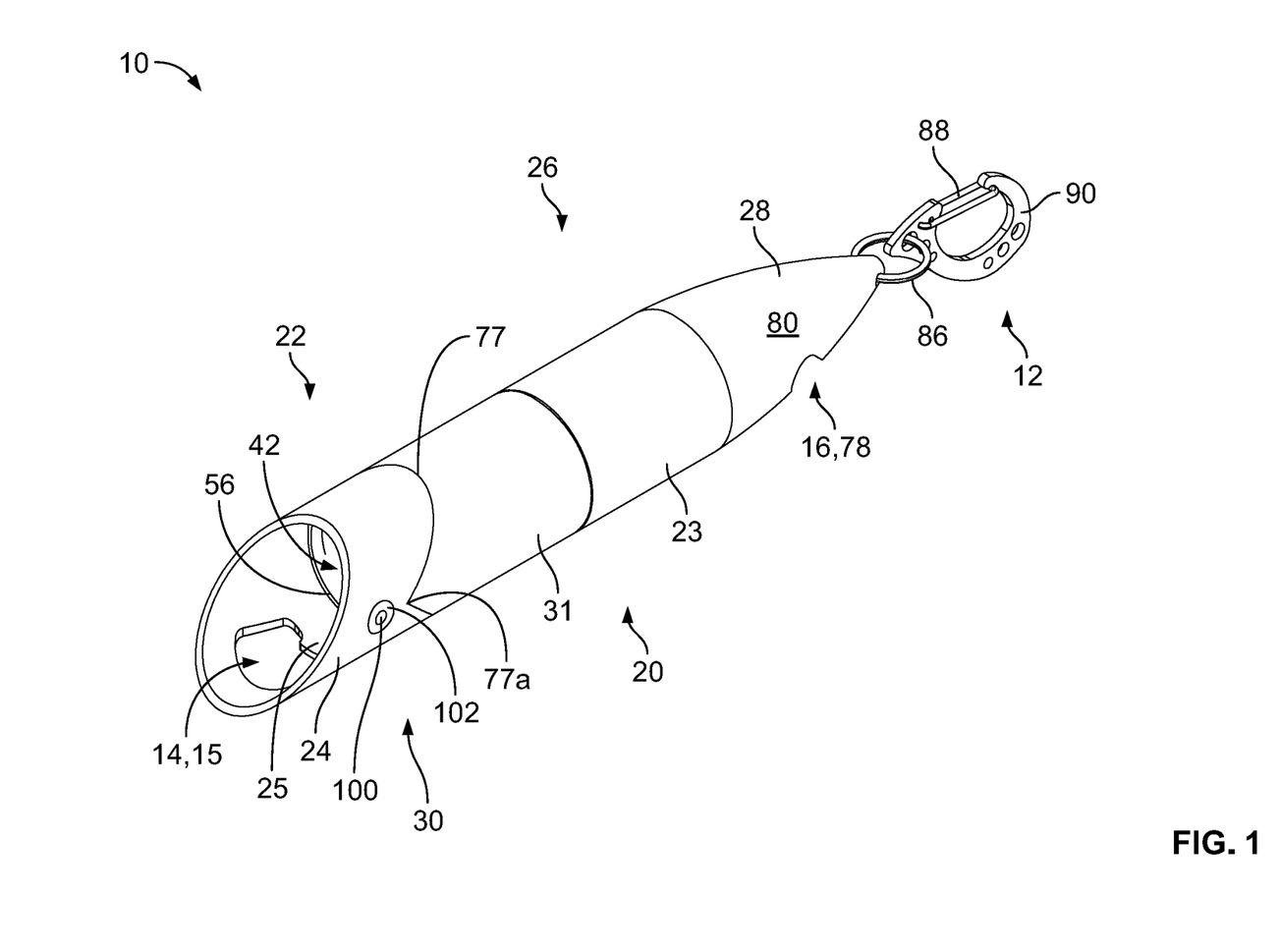
FIG. 1 is a front perspective view of a flashlight according to exemplary embodiments of the present disclosure.
Figure 2:
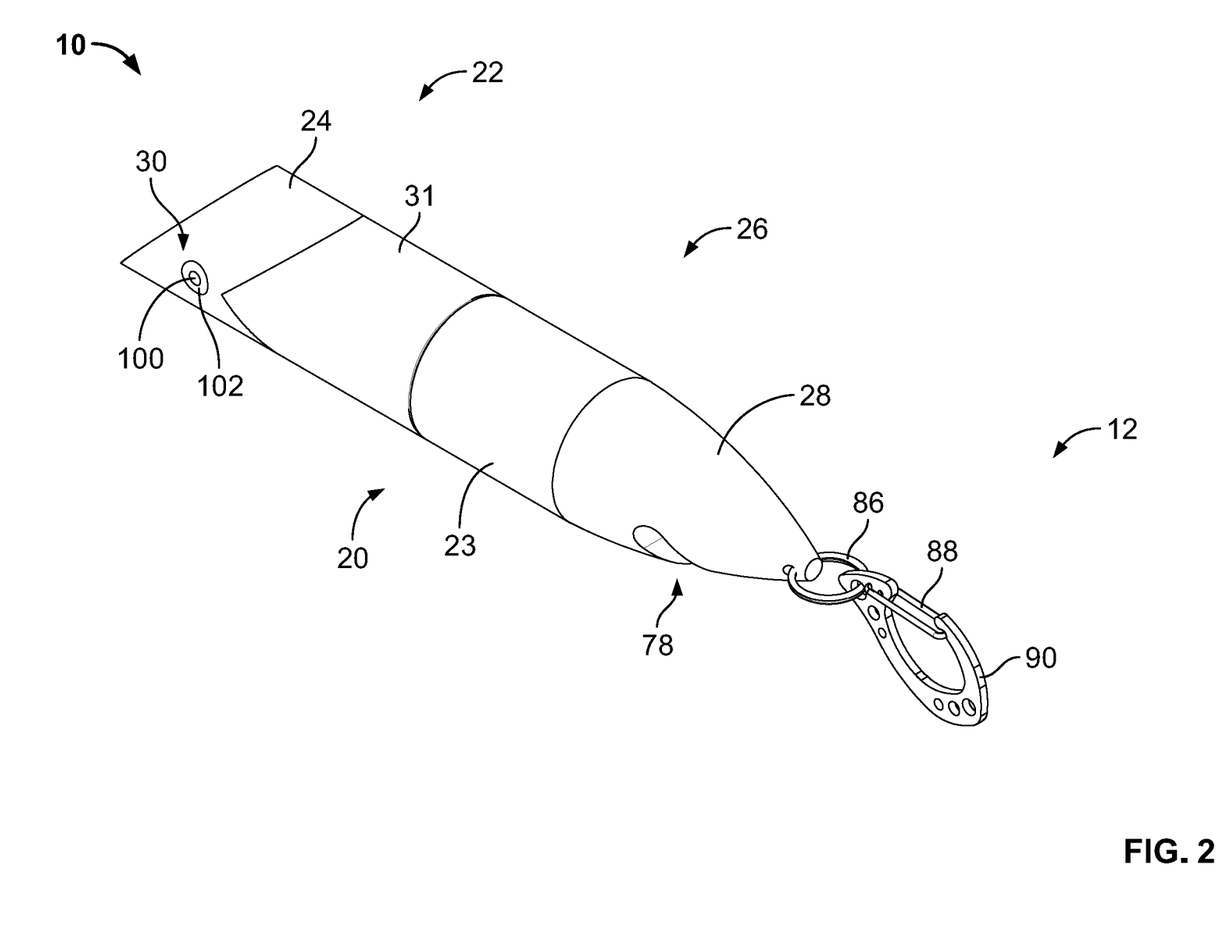
FIG. 2 is a rear perspective view of the flashlight.
Figure 3:
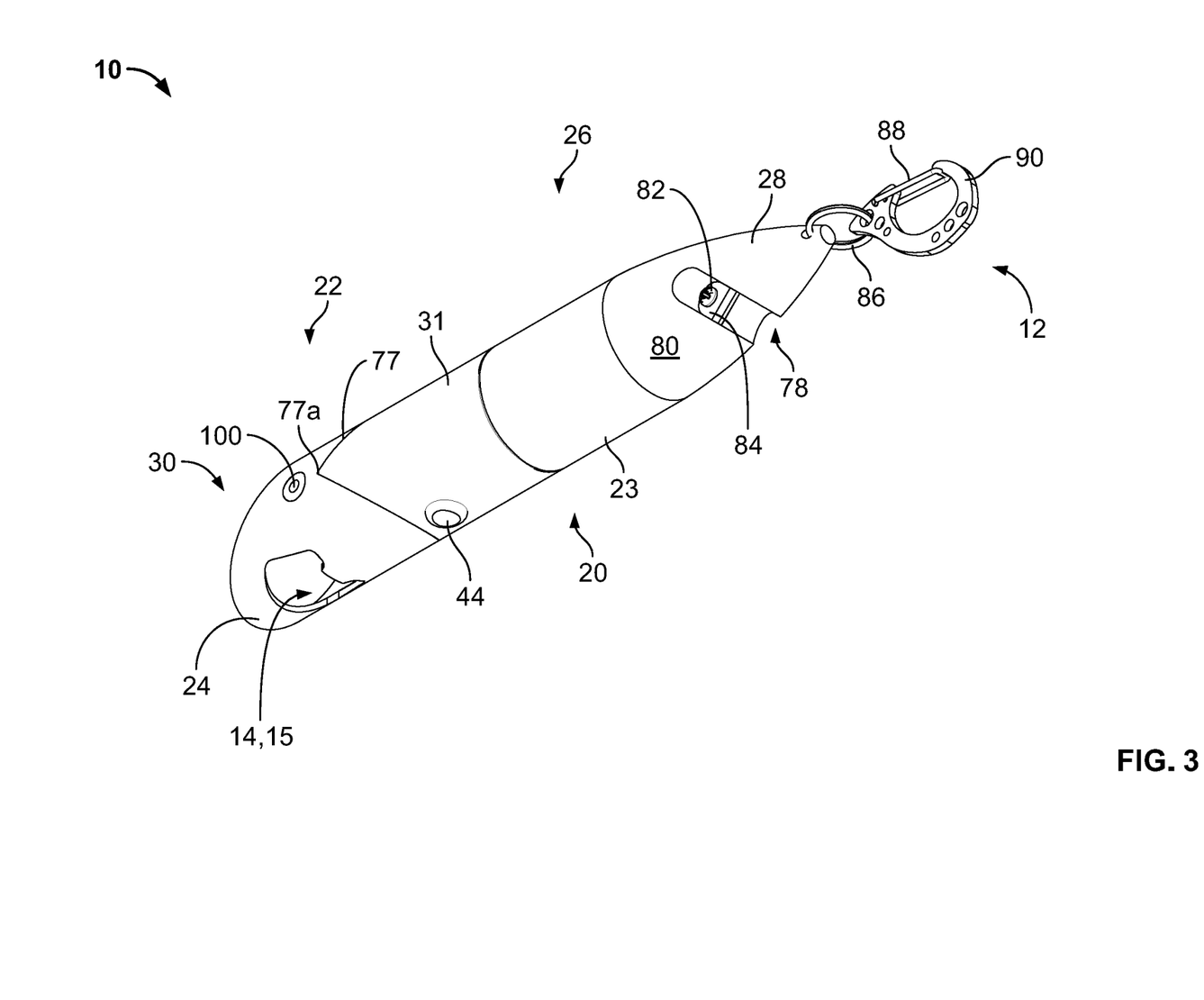
FIG. 3 is a lower, rear perspective view of the flashlight.
Figure 4:
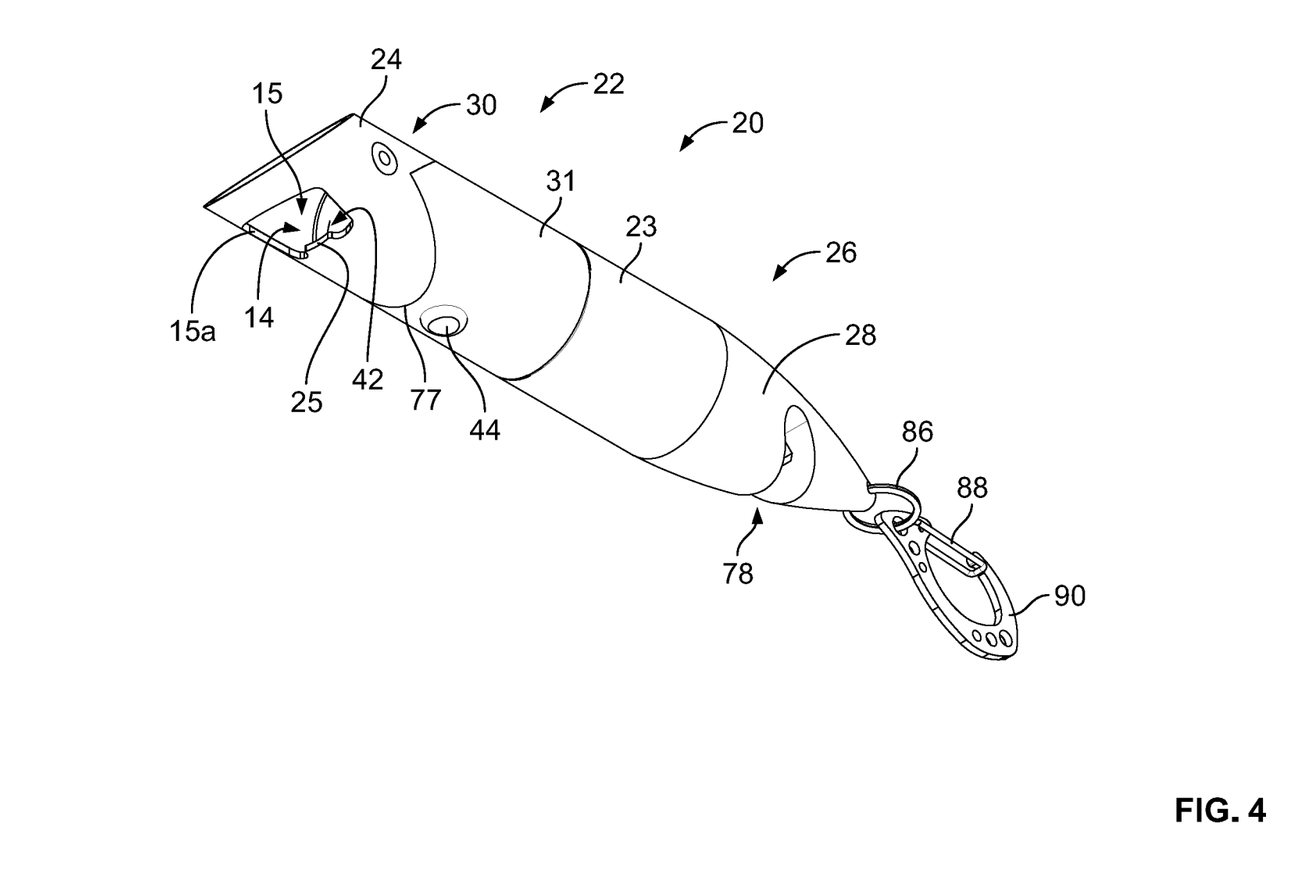
FIG. 4 is a lower, front perspective view of the flashlight.
Figure 5:
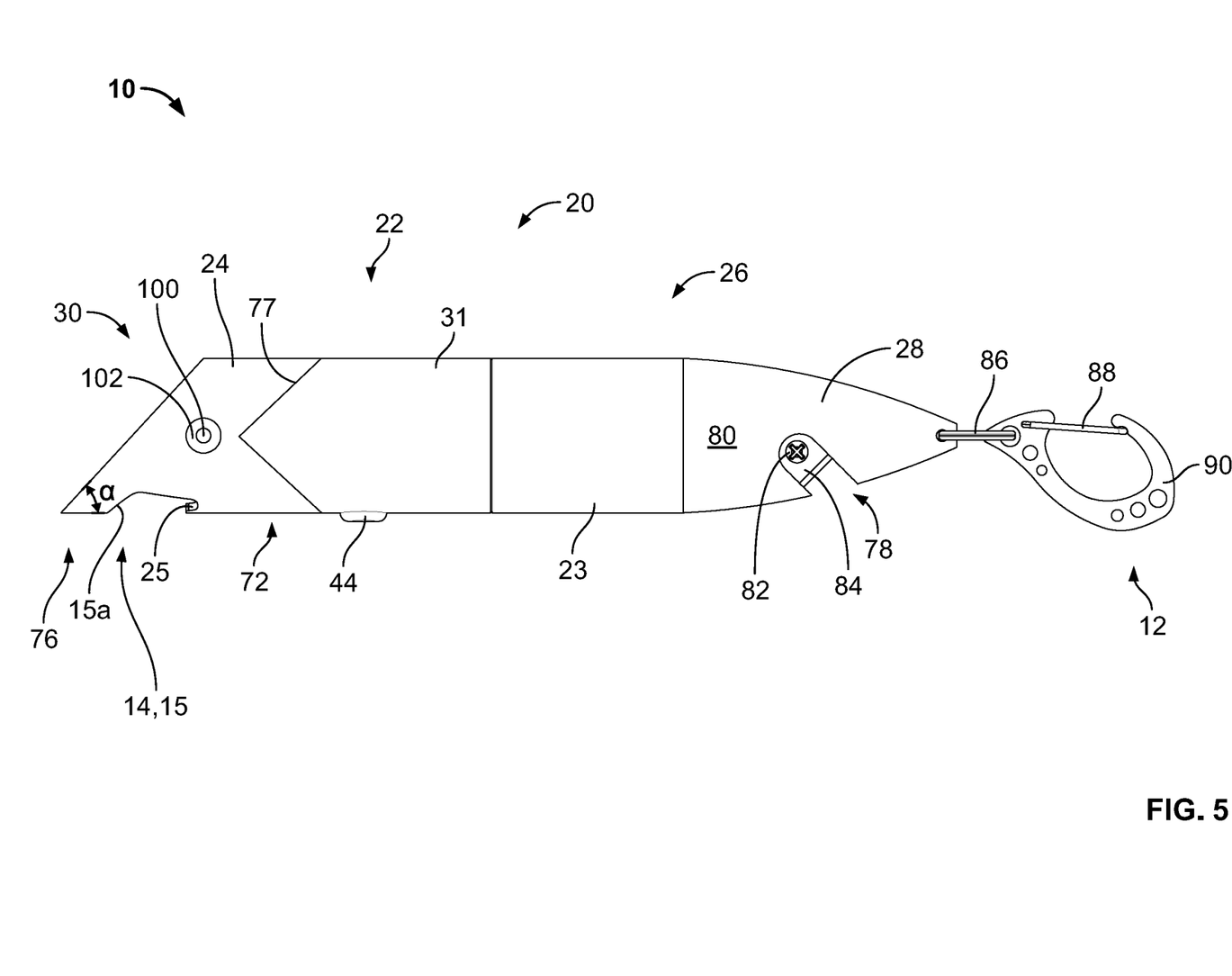
FIG. 5 is a right side view of the flashlight.
Figure 6:
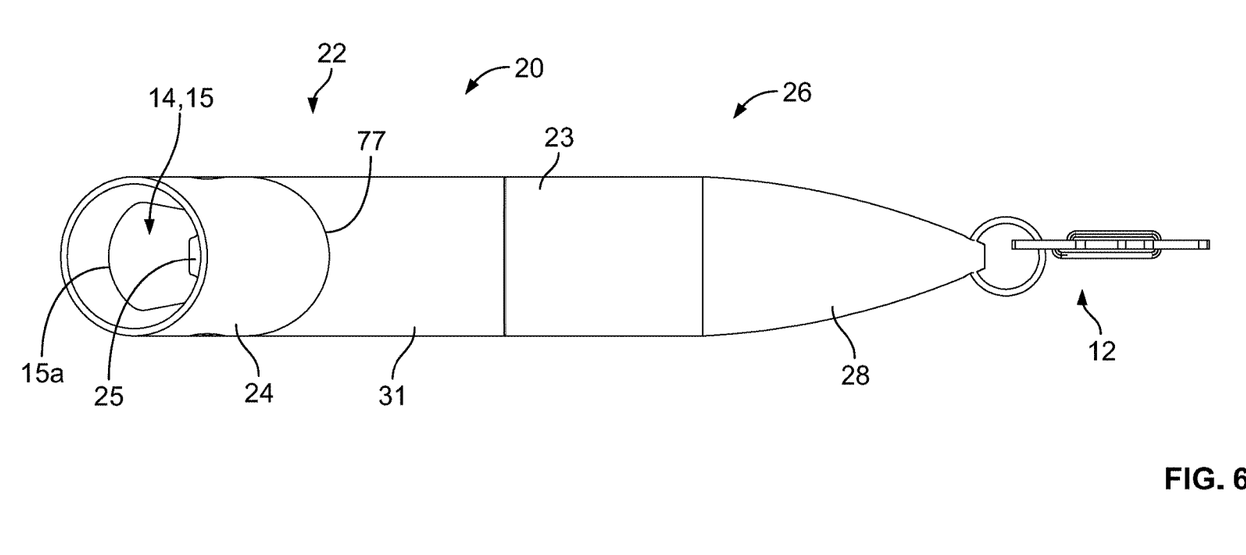
FIG. 6 is a bottom view of the flashlight.
Figure 7:
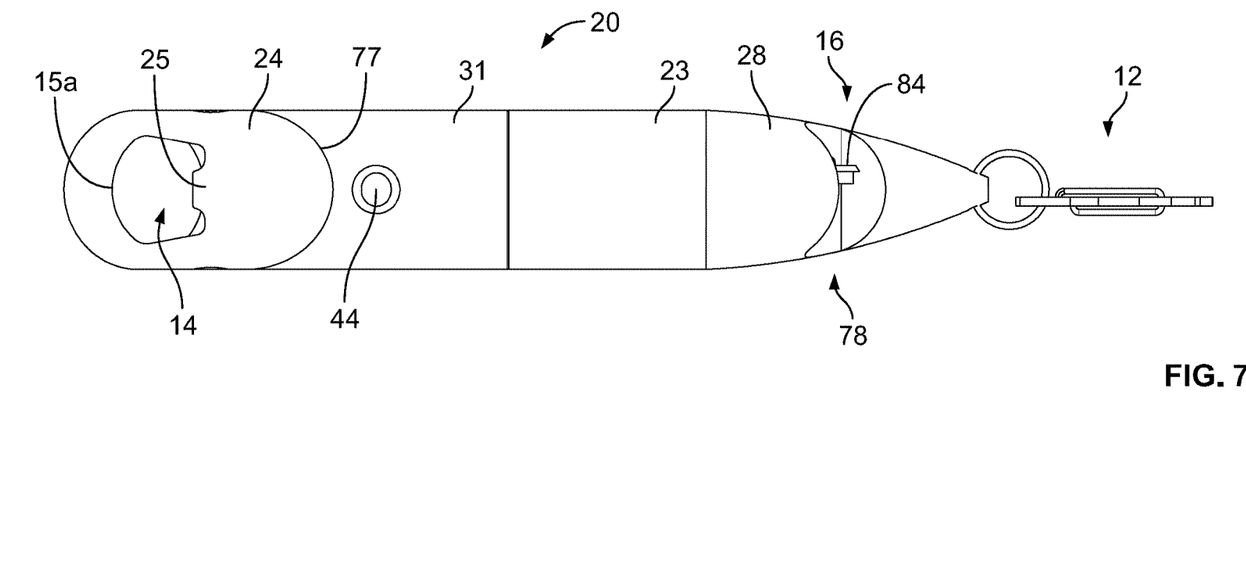
FIG. 7 is a top view of the flashlight.
Figure 8:
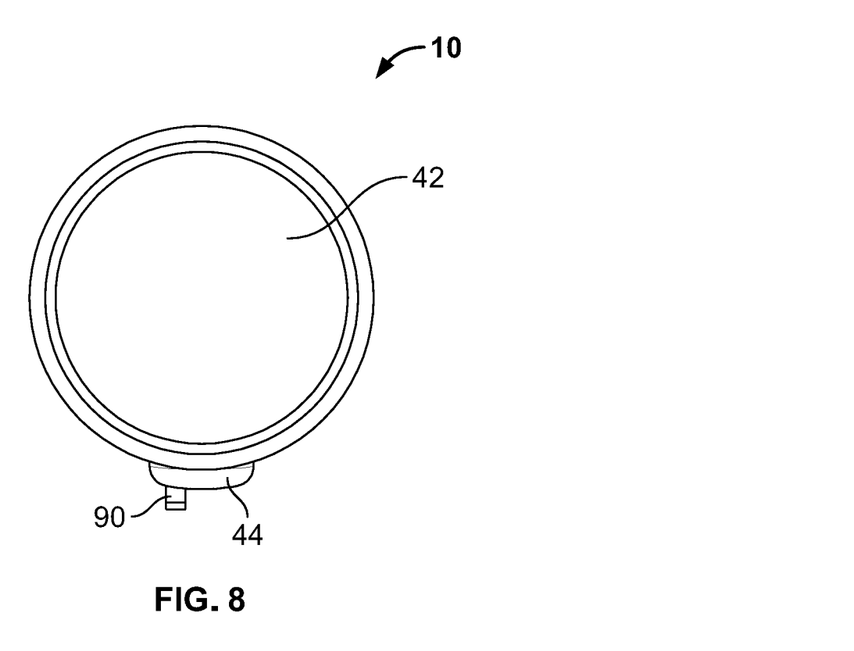
FIG. 8 is a front view of the flashlight.
Figure 9:
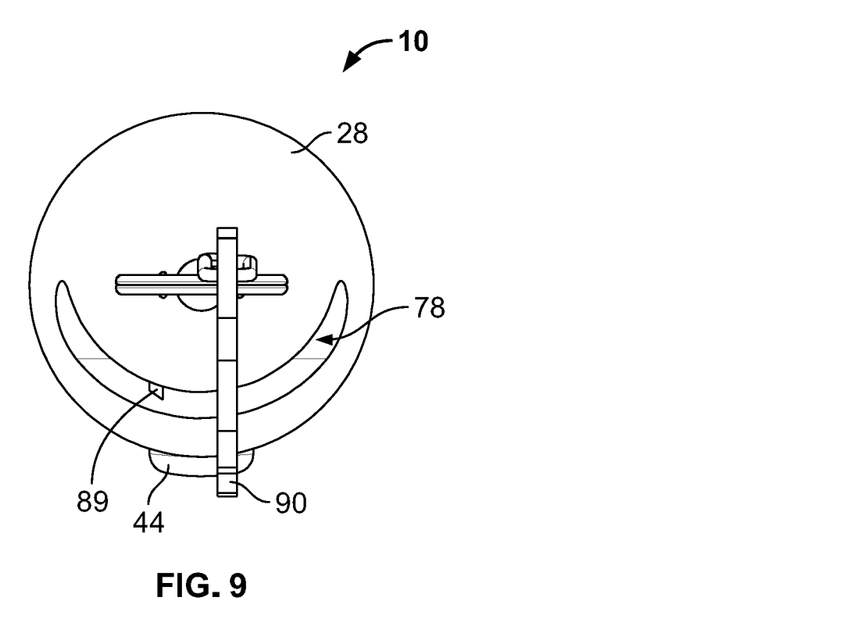
FIG. 9 is a rear view of the flashlight.
Figure 10:
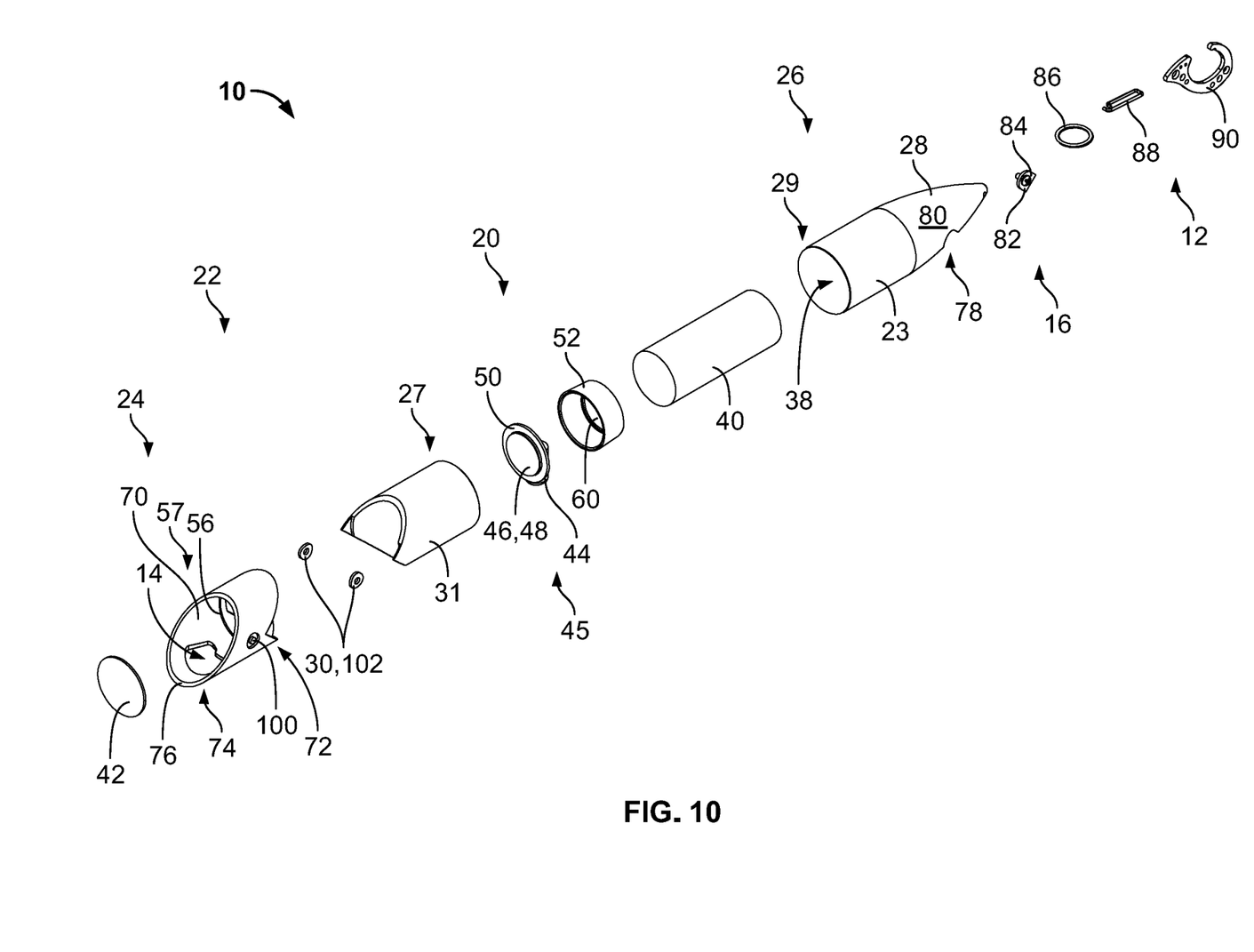
FIG. 10 is an exploded view of the flashlight.
Figure 11:
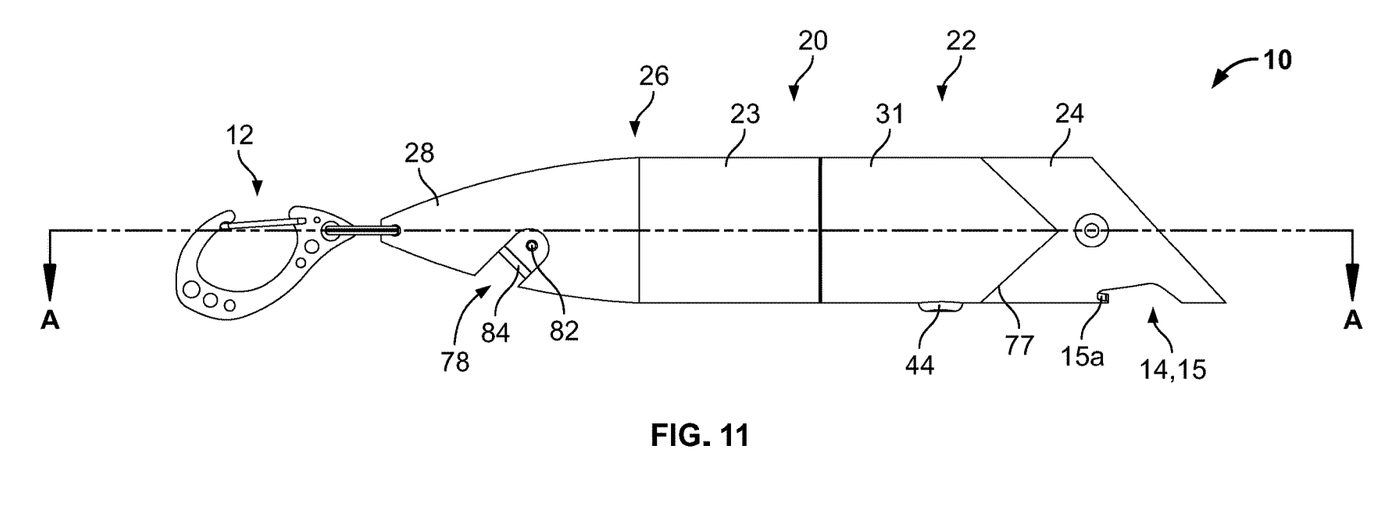
FIG. 11 is a left side view of the flashlight.

The front body 22 has a substantially cylindrical shape and includes a first extent or a head portion 24, eyes 30, the bottle opener 14 and retaining ring 56. The first extent or head portion 24 may be configured to look like a fish head or lure head, while the remaining portion or second extent 31 is configured to look like a portion of a fish body or lure body. This is accomplished by forming a triangle shape in the rear extent 72 of the head portion 24, while a front extent 74 of the head portion 24 contains an angled or sloped leading edge 76. The rear extent 31 of the head portion 24 is defined by a boundary line 77. As shown in the Figures, the boundary line 77 can have an angled segment 77*a* proximate the eye feature 100. Best show in connection with FIG. 5, an inner angle α between the sloped leading edge 76 and the bottom of the flashlight 10 may be between 70-10 degrees and preferably approximately 45 degrees. The head portion 24 may be separate from the rest of the front body 22, as shown in FIG. 10, or they may formed as a single part. Also, in some embodiments, the head portion 24 may be a different color than the remainder 31 of the front body 22, which enables the flashlight 10 to appear more like a fishing lure or a fish. For example, the head portion 24 may be colored red, while the remainder 31 of the front body 22 may be colored white.

The bottle opener 14 includes an aperture 15 formed through an extent of the head portion 24, wherein the aperture 15 is defined by an irregular edge periphery 15*a*. The irregular aperture periphery 15*a* is configured to allow a user to place a protrusion 25 of the head portion 24 under a first extent of a bottle cap when a second extent of a bottle cap is placed within the aperture 15. Once the protrusion 25 of the head portion 24 is placed under the bottle cap, a user can apply an upwardly-directed force on the body of the 20 of the flashlight 10, primarily on the rear body portion 26. This upwardly directed force causes the protrusion 25 to apply a prying force on the first extent of the bottle cap that is directed upwardly and away from the bottle, which in turn allows for the removal of the bottle cap from the upper lip of the bottle.

The eyes 30 are positioned within the head portion 24 of the front body 22 and are designed to make the flashlight 10 look like a fishing lure or a fish. The eyes 30 may have two parts, wherein a first part 100 may be configured to look like the pupil of a fish eye and the second part 102 may be configured to look like the iris or sclera of a fish eye. The eyes 30 may be separate components from the head portion 24, as shown in FIG. 10, or they may be formed as a part of the front body 22. In other embodiments, the eyes 30 may be light emitting diodes ("LEDs") that may light up when: (i) a user turns "On" or illuminates the flashlight 10 or (ii) when both an optical sensor and motion sensor, which are built into the flashlight 10, detect a limited amount of ambient light and movement of the flashlight 10. For example, the flashlight 10 may include an optical sensor or a motion sensor along with a timer. Upon the detection of motion, the flashlight 10 may illuminate the LEDs that are disposed within the eyes 30 and start a timer. After a predetermined amount of time, as determined by the timer, the flashlight 10 may turn "Off" or un-illuminate the LEDs that are disposed within the eyes 30. This configuration may allow a user to easily find the flashlight 10 in a dark environment.

The retaining ring 56 is a projection that extends inward from the inner surface 70 of the head portion 24. The retaining ring 56 is positioned rearward from the bottle opener 14. The retaining ring 56 is configured to retain the lens 42 adjacent to the reflector 52 and within the flashlight 10. The ring 56 is also configured to help prevent water from entering into the flashlight 10.

The rear body 26 includes a streamlined tail segment 28, a recess or slot 78, a line cutter 16, and an attachment mechanism 12. In particular, a first extent of the rear body is cylindrical and the second extent or tail segment 28 is cone shaped. The cone shaped tail 28 contains the recess 78 that receives the line cutter 16. The recess 78 allows the line cutter 16 to be recessed within an outer surface 80 of the rear body 26, which helps ensure that the line cutter 16 stays sharp as it helps prevent the line cutter 16 from coming into accidental contact with other objects. The line cutter 16 includes an element with a sharpened edge or a blade 84 that is releasably attached to the tail 28 of the rear body 26 by an elongated coupler 82. The blade is configured such that it can cut a fishing line when a user places the blade 84 in contact with the fishing line and moves the blade 84 back and forth. Once the blade 84 becomes dull, a user can replace the blade 84 by: (i) unscrewing the elongated coupler 82 from the rear body 26, (ii) removing the blade 84 from the recess 78, (iii) placing a replacement blade 84 within the recess 78, and (iv) by screwing the elongated coupler 82 to the rear body 26.

The attachment mechanism 12 includes a ring 86 and a carabiner 90. The carabiner 90 includes a retainer 88, which is coupled to the carabiner 90 and forms the closure mechanism of the carabiner 90. The ring 86 is configured to couple the carabiner 90 to the rear body 26. This configuration allows the carabiner 90 to be positioned in various positions relative to the rear body 26. Specifically, this configuration allows for angular movement of the rear body 26 in comparison with the carabiner 90, but limits the rotational movement of the rear body 26 in comparison with the carabiner 90. In other embodiments, different coupling means may be utilized to couple the carabiner 90 to the rear body 26, such as a coupling means that allows for both angular and rotational movement. In even other embodiments, the attachment mechanism 12 may be a different attachment mechanism, such as a hook, eyelet or loop, a chain, a clip, a D ring, or any other known attachment mechanism.

Figure 12:
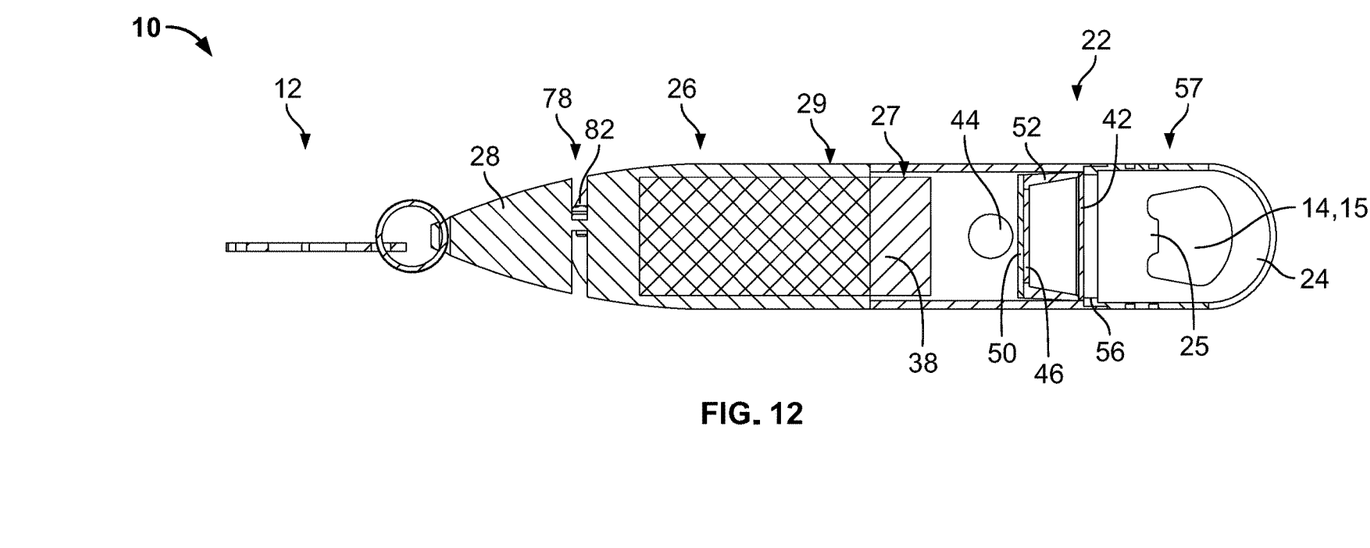
FIG. 12 is a cross-sectional view of the flashlight taken along the A-A line of FIG. 11.

Referring to FIG. 10, the lighting element 45 includes the lens 42, a lighting element printed circuit board ("PCB") 50, an emitter assembly 46, the reflector 52, and a switch 44. The lens 42 is positioned between the reflector 52 and the retaining ring 56. This configuration helps ensure that substantially all of the light passes through the lens 42, while retaining the lens 42 within the flashlight 10. The lens 42 may have a cross-sectional shape that is: (i) substantially rectangular, as shown in FIG. 12, (ii) convex, or (iii) concave. This cross-sectional shape may be chosen based on the desired light distribution and the type of emitter assembly 46. As described in detail below, the lens 42 may act as a first or primary optic in some embodiments of the flashlight 10. Due to the angled leading edge 76, the head portion 24 forms a shroud 57 that protects the lens 42 and the lighting element 45 as they are recessed inward from the bottle opener 14 within the shroud 57. The lighting element PCB 50 is positioned rearward from the lens 42 and emitter assembly 46. The lighting element PCB 50 contains the necessary circuitry (e.g., fixed resistors, variable resistors, capacitors, inductors, diodes, or other similar components) to receive electrical current from the power source 40 and supply the received electrical current to the emitter assembly 46.

The emitter assembly 46 is positioned adjacent to the lighting element PCB 50 and rearward from the lens 42. The emitter assembly 46 is composed of between 1 and 30 individual emitters 48, preferably between 3 and 25 individual emitters 48, and most preferably between 4 and 8 individual emitters 48. Every individual emitter 48, which is a part of the emitter assembly 46, is configured to illuminate when power is applied to the emitter assembly 46 by the lighting element PCB 50. The emitter assembly 46 may produce between 0 and 3000 lumen, preferably between 0 and 1000, and most preferably between 0 and 300. It should be understood that in other embodiments every individual emitter 48 contained within the emitter assembly 46 may not be configured to illuminate when power is applied to the emitter assembly 46. For example, a user may be able to select the desired individual emitters 48 that the user wants illuminated, while keeping other individual emitters 48 unilluminated, which can vary the brightness of the emitted light.

The emitter assembly 46 may be a Chip on Board ("COB") LED or surface-mount device LED. If the emitter assembly 46 is a COB LED, then the emitter assembly 46 contains multiple individual light emitters 48. Each of these individual light emitters 48 is covered by the lens 42, which acts as a first or primary optic. In this configuration, there is no secondary optic, as the individual light emitters 48 do not have individual optics. In other embodiments, a secondary optic may be included within the flashlight 10. For example, if a standard LED is selected as the emitter, the flashlight 10 may have a secondary optic. In this configuration, the primary optic for the standard LED is the optic that surrounds the LED, while the secondary optic is the lens 42. This secondary optic may be configured to protect the standard LEDs from the surrounding environment and protect the user from contacting the hot outer surface of the primary optics after the LEDs. In other embodiments, the lens 42 may also be omitted. In this configuration, there is no primary optic and no secondary optic. It should be understood that different types of emitter assemblies 46 may be utilized, such as: (i) a standard LED, (ii) organic LED, (iii) induction light panel, (iv) silicon quantum dot phosphor (SiQD-phosphor), or (v) surface-mount device LED. In addition, different color emitters 48 (e.g., red, green, blue) may be contained within the emitter assembly 46.

The flashlight 10 includes a reflector 52 that is positioned rearward of the lens 42. The bottom 58 of the reflector 52 has a hole 60 therethrough that is configured to receive the emitter assembly 46. This reflector 52 helps focus the emitted light from the emitter assembly 46 in a specific direction to achieve the desired light distribution and pattern. It should be understood that the reflector 52 is configured to reflect substantially all of the light that is emitted by the emitter assembly 46 through the lens 42. In some embodiments, the relative position of the emitter assembly 46 and the reflector 52 or the shape of the reflector 52 may be altered by the user to change the light distribution pattern. For example, a use may rotate the head portion 24 in relation to the remaining part of the body 20, which causes that interior surface of the reflector to alter the shape of the interior surface. This alteration in the shape of the interior surface causes the light that is emitted from the emitter assembly 46 to have a narrower beam diameter. In other words, this rotation may cause the beam to become more focused. In other embodiments, the flashlight 10 may not have a reflector 52 and instead that emitter assembly 46 may be positioned closer to the lens 42.

The switch 44 of the flashlight 10 enables the user to alter the operational mode of the flashlight 10. This is done by altering the current that can pass from the power source 40 to flow to the emitter assembly 46 to illuminate or turn "On" the flashlight 10. In one embodiment, the switch 44 is a push button switch that the user depresses and releases to change the operational mode of the flashlight 10. For example, the user: (i) may depress the button one time to turn "On" the lighting element 45, (ii) may depress the button two times to turn "Off" the lighting element 45, or (iii) may depress the button three times to place the lighting element 45 in an SOS or flashing mode. It is to be understood that the mode switch 44 can be positioned within the front body portion 22 or the rear body portion 26. In particular, the mode switch 44 may be placed within: (i) the end of the second substantially cone shaped extent 28 of the rear body portion 26, (ii) the side wall of the second substantially cone shaped extent 28 of the rear body portion 26, (iii) the side wall of the first substantially cylindrical extent 23 of the rear body portion 26, (iv) the side wall of the second extent 31 of the front body portion 22, or (v) the side wall of the first extent 24 of the front body portion 22, as shown in FIGS. 1-13. It should also be understood that the mode switch 44 may be replaced with an assembly that is configured to utilize one or more buttons, switches, sliders, sensors physically coupled to the flashlight 10 (e.g., motion, light, sound, or heat), sensors physically positioned at a distance from the flashlight 10 (e.g., cell phone, laptop, RF remote control, remote devices described in U.S. patent application Ser. No. 15/812,852, and which is fully incorporated herein by reference, or other devices that are connected to the portable flashlight 10 via the internet). Further, the fishing lure-shaped flashlight 10 may include an assembly that includes a combination of elements that control the operation of the emitter assembly 46. For example, the flashlight 10 may include a local sensor that is located in the tale portion 26 and a mode switch 44 that is located within the head portion 24.

The power source 40 is configured to be positioned within a receiver 38 formed within the body 20. The power source 40 provides electrical power to the flashlight 10. In particular, the power source 40 may be a combination of removable non-rechargeable batteries disposed within a battery cartridge. Preferably, the battery cartridge holds three AAA non-rechargeable batteries. It should be understood that different configurations of the battery cartridge may be implemented. For example, the battery cartridge may be able to: (i) hold additional batteries, such as 12 or 15 total batteries, (ii) fewer batteries, such as 1-9 total batteries, (iii) larger batteries, such as C or D sized batteries, or (iv) smaller batteries, such as AAAA or AAA sized batteries. Preferably, the battery cartridge has a length that extends along the longitudinal axis A-A, shown in FIG. 11, of the flashlight 10 that is longer than the width that extends along the horizontal axis of the flashlight 10.

The power source 40 can be configured such that it allows the power source 40 to supply power to the flashlight regardless of which direction the power source 40 is inserted into the receiver 38. An exemplary description of such a power source configuration is described in U.S. patent application Ser. No. 16/110,406, which is incorporated herein by reference. It should be understood that instead of being a combination of removable non-rechargeable batteries disposed within a battery cartridge, the power source 40 may be a removable non-rechargeable battery, a removable rechargeable battery, a combination of removable rechargeable batteries, a combination of removable rechargeable batteries disposed within a battery cartridge, a non-removable rechargeable battery, a combination of non-removable rechargeable batteries disposed within a battery cartridge, a DC power supply that is configured to connect to a 12 volt car battery, a DC power supply that is configured to connect to a 110 volt alternative current outlet, or any other type of power supply that is known to a person of skill in the art.

In some embodiments, the flashlight 10 may be waterproof (e.g., ip67 or ip68) and design to float in water. In other embodiments, the fighting flashlight 10 may be configured to have an internal compartment, which may be located in the rear body 26. This compartment may allow the user to store items (e.g., keys, money, medicine or other accessories) in a dry location. In another embodiment, an extent of the body 20 may have a magnet contained therein to allow the flashlight 10 to magnetically couple to a magnetic surface. For example, the head portion 24 may be formed from a material that is magnetic.

Figure 13:
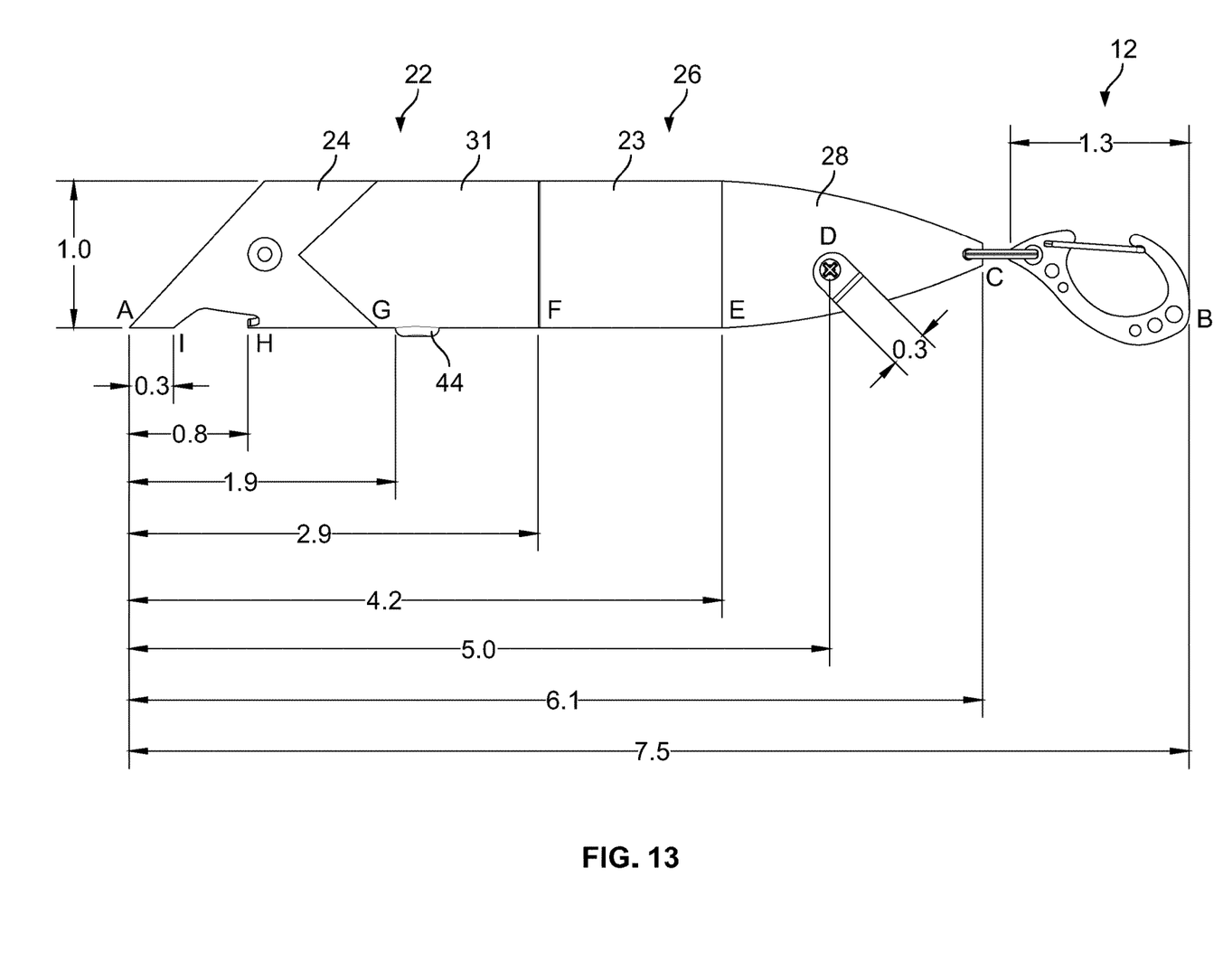
FIG. 13 is a right side view of the flashlight with exemplarily dimensions.

In another embodiment, the flashlight 10 may include a secondary emitter assembly that extends horizontally along the body 20 of the flashlight 10. This secondary emitter assembly may be positioned such that it is substantially perpendicular to the lens 42. For example, the secondary emitter assembly may be positioned on the opposite side of the bottle opener 14 and may extend substantially between points E and G, which are shown in FIG. 13. This secondary emitter assembly may be used as a work light or lantern. In a further embodiment, the rear body 26 may include a pair of pliers, wherein the pliers are either separate from the rear body 26 or are integrated into the rear body 26.

In another embodiment, the flashlight 10 may have a rechargeable battery, and there may be a USB receptacle that is disposed on the exterior of the body 20. This would allow the user to charge and discharge the power source 40 using a USB cable. For example, the user could charge their cellular phone from the flashlight 10 without removing the power source 40 from the receptacle 38. In a further embodiment, the flashlight 10 may include an emergency position indicating radio beacon (e.g., EPIRB, SART, or AIS-SART). The radio beacon may operate at the 406 MHz frequency and may aid search and rescue operations, such as COSPAS-SARSAT, in finding the user. In an even further embodiment, the flashlight 10 may include a speaker and a wireless module (e.g., a module that is compatible with Bluetooth, NFC, Felica, WiFi, Zigbee, RFID, cellular, WiMAX, ISM, or any combination of these technologies) to enable a user to play music from the flashlight 10. In another embodiment, the flashlight 10 may include an ultraviolet light that is designed to attract and kill bugs. Other embodiments or combinations of the above embodiments are contemplated by this disclosure.

The flashlight 10 enables numerous benefits over prior lighting systems. Unlike a lighting system, the present disclosure provides for a system that synergistically and advantageously combines accessories that are useful for the user in a compact and portable configuration. While the foregoing has described what are considered to be the best mode and/or other examples, it is understood that various modifications may be made therein and that the subject matter disclosed herein may be implemented in various forms and examples, and that the teachings may be applied in numerous applications, only some of which have been described herein. It is intended by the following claims to claim any and all applications, modifications and variations that fall within the true scope of the present teachings. Other implementations are also contemplated.

While some implementations have been illustrated and described, numerous modifications come to mind without significantly departing from the spirit of the disclosure; and the scope of protection is only limited by the scope of the accompanying claims. For example, the overall shape of the flashlight 10 may be altered to be any one of the following shapes a triangular prism, a rectangular prism, a cube, a pentagonal prism, a hexagonal prism, octagonal prism, sphere, a cone, a tetrahedron, a cuboid, a dodecahedron, a icosahedron, a torus, a octahedron, a ellipsoid, or any other similar shape.

The flashlight 10 may have various lengths. For example, the first length that extends between A and B, shown in FIG. 13, may vary between 15 inches and 3.75 inches and is preferably 7.5 inches, while the second length that extends between A and C, shown in FIG. 13, may vary between 12.2 inches and 3.05 inches and is preferably 6.1 inches. The third length that extends between A and D, shown in FIG. 13, may vary between 10 inches and 2.5 inches and is preferably 5 inches, while the fourth length that extends between A and E, shown in FIG. 13, may vary between 8.4 inches and 2.1 inches and is preferably 4.2 inches. The fifth length that extends between A and F, shown in FIG. 13, may vary between 5.8 inches and 1.45 inches and is preferably 2.9 inches, while the sixth length that extends between A and G, shown in FIG. 13, may vary between 3.8 inches and 0.95 inches and is preferably 1.9 inches. The seventh length that extends between A and H, shown in FIG. 13, may vary between 1.6 inches and 0.4 inches and is preferably 0.8 inches, while the eighth length that extends between A and I, shown in FIG. 13, may between 0.6 inches and 0.15 inches and is preferably 0.3 inches. The flashlight 10 may have a width that is between 4 and 0.25 inches, preferably between 2.5 and 0.5 inches, and most preferably between 1.25 inches and 0.75 inches. For example, the flashlight 10 may have a first length (i.e., between A and B shown in FIG. 13) that is approximately 10 times the width, preferably 8.5 times the width, and most preferably at least 7.5 times the width. In a commercial embodiment, the flashlight 10 may have lengths and widths that are shown in FIG. 13. This configuration allows the flashlight 10 to have an elongated configuration, as the length is substantially greater than the width.

The front portion 22 may be combined with the rear portion 26 to form a single body that houses a power source 40. In this configuration, the power source 40 is a rechargeable battery that is not intended to be removed from the body 20. The body 20 may be formed from: (i) metal, such as aluminum or steel, (ii) a polymer material, such as plastic, (iii) a magnetic material, (iv) a material that floats in water, or (v) a combination of the prior material. The lens 42 may be made from a polymer material, such as plastic, and may be transparent, partially transparent, or colored.

The flashlight 10 may be colored a single color (e.g., white) except for: (i) eyes 30, (ii) switch 44, (iii) head portion 24 of the front body 22, (iv) an extent of the line cutter 16, and (v) the attachment mechanism 12. In particular, the attachment mechanism 12 and the extent of the line cutter 16 may have a silver color, while the head portion 24 of the front body 22 and the switch 44 may have a red color. The outer surface of the flashlight 10 may include indicia, such as the manufacturer of the flashlight 10 or may be personalized to include a person's name or information.

Headings and subheadings, if any, are used for convenience only and are not limiting. The word exemplary is used to mean serving as an example or illustration. To the extent that the term includes, have, or the like is used, such term is intended to be inclusive in a manner similar to the term comprise as comprise is interpreted when employed as a transitional word in a claim. Relational terms such as first and second and the like may be used to distinguish one entity or action from another without necessarily requiring or implying any actual such relationship or order between such entities or actions.

Phrases such as an aspect, the aspect, another aspect, some aspects, one or more aspects, an implementation, the implementation, another implementation, some implementations, one or more implementations, an embodiment, the embodiment, another embodiment, some embodiments, one or more embodiments, a configuration, the configuration, another configuration, some configurations, one or more configurations, the subject technology, the disclosure, the present disclosure, other variations thereof and alike are for convenience and do not imply that a disclosure relating to such phrase(s) is essential to the subject technology or that such disclosure applies to all configurations of the subject technology. A disclosure relating to such phrase(s) may apply to all configurations, or one or more configurations. A disclosure relating to such phrase(s) may provide one or more examples. A phrase such as an aspect or some aspects may refer to one or more aspects and vice versa, and this applies similarly to other foregoing phrases.

Numerous modifications to the present disclosure will be apparent to those skilled in the art in view of the foregoing description. Preferred embodiments of this disclosure are described herein, including the best mode known to the inventors for carrying out the disclosure. It should be understood that the illustrated embodiments are exemplary only, and should not be taken as limiting the scope of the disclosure.

The invention claimed is:

1. A multi-purpose flashlight, comprising:
 an elongated body including:
  a front body portion having: (i) first extent that includes a bottle opener and (ii) a second extent that includes a front engaging structure,
  a rear body portion having: (i) a first substantially cylindrical extent that includes a rear engaging structure that is cooperatively dimensioned to interact with the front engaging structure to releasably couple the front body portion to the rear body portion and (ii) a second substantially cone shaped extent that includes a recessed cutting element;
  a lighting element disposed within the elongated body, said lighting element includes a lighting element printed circuit board coupled to an emitter assembly, a power source, and a switch, wherein said switch is configured to change the operational mode of the emitter assembly.

2. The multi-purpose flashlight of claim 1, further include an attachment mechanism that is coupled to the second extent of the rear body portion;
 wherein in a first position, the attachment mechanism is coupled to a support object in a first location; and
 wherein in a second position, (i) the flashlight is disconnected from the support object and brought by a user to a second location distant from the first location and (ii) the lighting element provides illumination to the second location.

3. The multi-purpose flashlight of claim 1, wherein the second extent of the rear portion of the elongated body further includes a slot that receives the cutting element.

4. The multi-purpose flashlight of claim 3, wherein the cutting element is removably secured within the slot by an elongated fastener.

5. The multi-purpose flashlight of claim 1, wherein front body portion includes a shroud that is configured to protect at least an extent of the lighting element, and wherein the bottle opener includes an opening formed in the shroud.

6. The multi-purpose flashlight of claim 1, wherein bottle opener is positioned adjacent to the lighting element.

7. The multi-purpose flashlight of claim 1, wherein the power source is a combination of removable non-rechargeable batteries disposed within a battery cartridge.

8. The multi-purpose flashlight of claim 1, wherein the first extent of the front body portion is a different color than the remaining portion of the elongated body to provide the flashlight with the appearance of a fishing lure.

9. The multi-purpose flashlight of claim 8, wherein the first extent of the front body portion includes a feature that is configured to have the appearance of a fishing lure eye.

10. The multi-purpose flashlight of claim 1, wherein the first extent of the front body portion includes a sloped edge, wherein the sloped edge and the inner surface of the shroud intersect to define an angle that ranges from 10-70 degrees.

11. A multi-purpose, hand-held flashlight, comprising:
 an elongated body including:
  a front body portion having: (i) first extent that includes a surface mounted feature that is configured to have the appearance of a fishing lure eye and (ii) a second extent that includes a front engaging structure,
  a rear body portion having: (i) a first substantially cylindrical extent with a rear engaging structure that releasably couples with the front engaging structure to join the front body portion to the rear body portion; and (ii) a second substantially cone shaped extent that includes a recessed cutting element;
  a lighting element disposed within the elongated body, said lighting element includes a lighting element printed circuit board coupled to an emitter assembly, a power source, and a switch, wherein said switch is configured to change the operational mode of the emitter assembly.

12. The multi-purpose, hand-held flashlight of claim 11, further include an attachment mechanism that is coupled to the second extent of the rear body portion;
 wherein in a first position, the attachment mechanism is coupled to a support object in a first location; and
 wherein in a second position, (i) the flashlight is disconnected from the support object and brought by a user to a second location distant from the first location and (ii) the lighting element provides illumination to the second location.

13. The multi-purpose, hand-held flashlight of claim 11, wherein the first extent of the front body portion includes a bottle opener with an aperture that is configured to receive an extent of a cap of a bottle to be opened.

14. The multi-purpose, hand-held flashlight of claim 11, wherein the second extent of the rear portion of the elongated body includes a slot that receives the cutting element.

15. The multi-purpose, hand-held flashlight of claim 14, wherein the slot and the cutting element are oriented substantially perpendicular to a longitudinal axis of the elongated body.

16. The multi-purpose, hand-held flashlight of claim 11, wherein bottle opener is positioned adjacent to the lighting element.

17. The multi-purpose, hand-held flashlight of claim 11, wherein the first extent of the front body portion includes eyes and is a different color than the remaining portion of the elongated body to provide the flashlight with the appearance of a fishing lure.

18. The multi-purpose, hand-held flashlight of claim 11, further comprises one of an optical sensor or a motion sensor that are configured to illuminate a second emitter that is coupled to the elongated body.

19. The multi-purpose, hand-held flashlight of claim 11, further comprises one of a magnet disposed within the elongated body, a speaker, or a radio beacon.

\* \* \* \* \*